May 24, 1960  E. ROFFMAN ET AL  2,938,162
NON-DESTRUCTIVE TESTING BY TELEVISUAL METHODS
Filed Jan. 24, 1957  2 Sheets-Sheet 1

INVENTORS
EUGENE ROFFMAN
SAMUEL E. TORREY
JOHN H. STRYKER

United States Patent Office 2,938,162
Patented May 24, 1960

2,938,162

NON-DESTRUCTIVE TESTING BY TELEVISUAL METHODS

Eugene Roffman, Philadelphia, and Samuel E. Torrey, Feasterville, Pa., and John Henry Stryker, Hammonton, N.J., assignors to the United States of America as represented by the Secretary of the Army Filed Jan. 24, 1957, Serial No. 636,215

2 Claims. (Cl. 324—37)

(Granted under Title 35, U.S. Code (1952), sec. 266)

The invention described herein may be manufactured and used by or for the Government for governmental purposes without payment of any royalty thereon.

This invention relates to a non-destructive testing by televisual methods of flaws or weaknesses in magnetic material at or near the surface of the metal. An object is to provide such a method and an apparatus for conducting that method whereby such a weakness may be seen at a remote location by the operator conducting the test. Another object provides such a method and apparatus whereby an outline of the flaw will be shown magnified out of proportion to the object in which such weakness occurs.

Many methods have been proposed for the detection of weaknesses in ferrous metal at or near the surface, but so far as is known no way has been devised for locating such a flaw televisually.

According to this invention, a magnetic field of substantially uniform density is passed between the surface of the test specimen and a pickup device. Around the edges of the flaw, the flux lines will be crowded inasmuch as that flaw will be less permeable to the flux than the material surrounding the flaw. A rotating perforated disc of non-magnetic material is placed between the specimen and pickup device enabling the flux density to be scanned just as the intensity of light was scanned by the earlier televisual methods and apparatus antedating the use of the cathode ray tube for that purpose. Changes in flux density change into voltage modulations by the pickup which are transmitted to a receiver. There the voltage modulations are scanned and changed into light intensity changes after the manner of the televisual practice either before or after the adoption of the cathode ray tube for that purpose.

Figure 1:
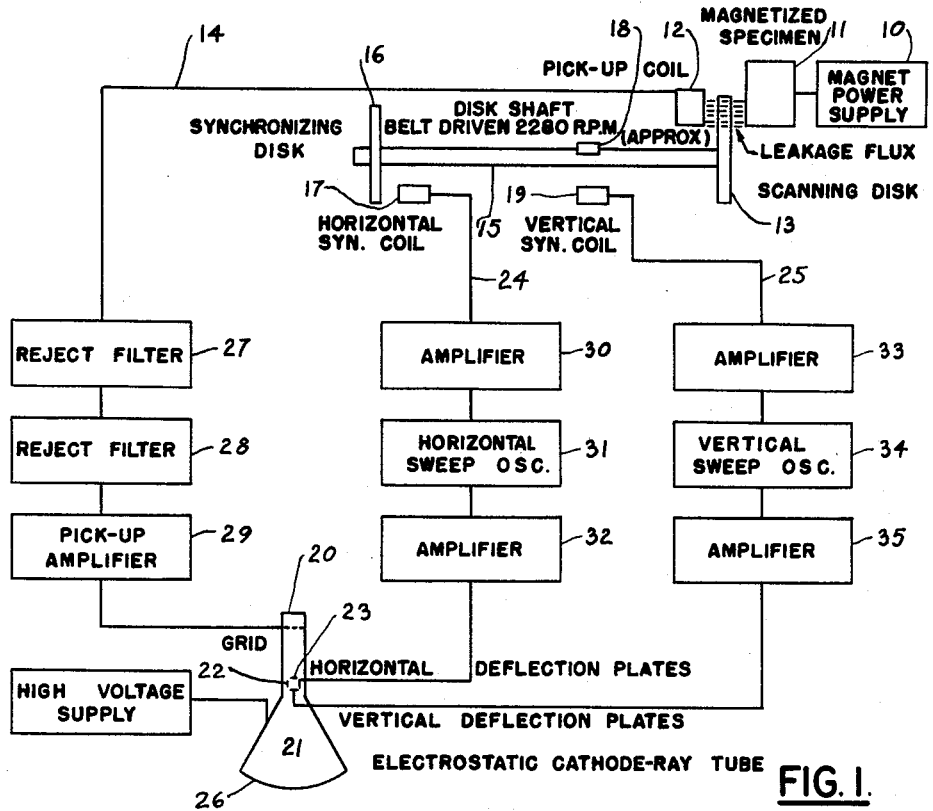
Fig. 1 is a block diagram showing the apparatus embodied in this invention.
Figure 3:
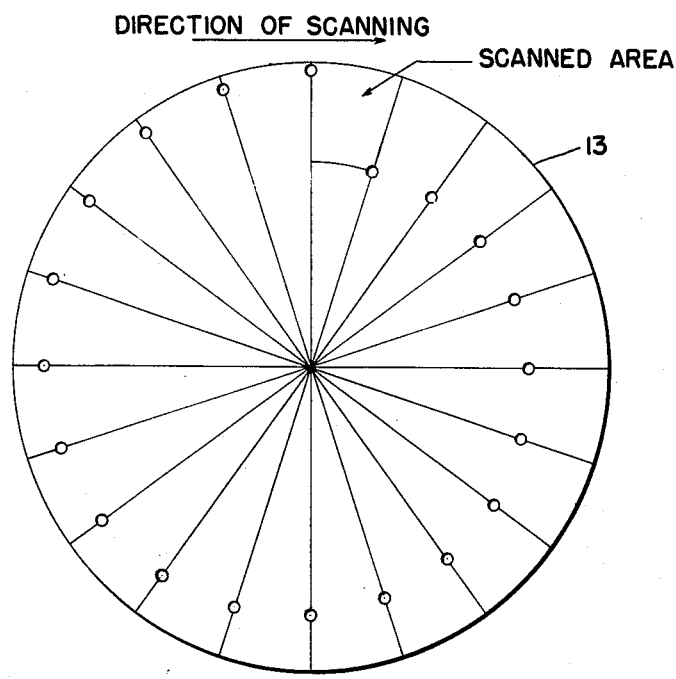
Fig. 3 is a side view of a scanning disk.

Some convenient source of fairly constant and uniform flux such as that induced from a direct current in the magnet power supply 10 is located adjacent the specimen 11 to be tested, and flux is passed through the specimen 11 into a pickup device 12. This pickup device is a coil type. Between the pickup device and specimen is a rotating disc 13 of copper or brass located close to each so that the air gap is small. In the present instance this scanning disc 13 contained 20 holes (see Fig. 3) about ⅛ or ¹⁄₁₀ an inch in diameter uniformally but slightly spirally spaced as were the early scanning discs adjacent to the periphery, and the disc was rotated at 2,280 r.p.m. A wire 14 leads from the pickup device 12 to a receiver. The shaft 15 on which disc 13 rotates is driven by a motor not shown, in this case the motor is connected with the shaft through a driving belt also not shown and forming no part of the present invention. The scanning disc shaft 15 has on it another disc 16 cooperating with a horizontal synchronizing coil 17 for the purpose of locking the horizontal deflection plate frequency in exact synchronism with that of the scanning disc 13. Also on the shaft 15 is a permanent magnet 18 which is embedded in insulation and rotates past the vertical synchronizing coil 19 for insuring the frequency in the vertical deflecting plates of the picture tube being in synchronism with that of the scanning disc. Electric current modulations in the wire 14 are changed into light modulations and scanned either with the mechanical scanning disc of the early television art or with the electronic scanning in the cathode ray tube. For purposes of illustration this invention shows a cathode ray type receiver. The scanning in the receiver of Fig. 1 is done electronically.

The wire 14 is connected to the grid 20 in the cathode ray tube 21 and this tube has horizontal deflection plates 22 for electronically scanning along with deflection plates 23 for vertical scanning. A wire 24 leads from the horizontal synchronizing coil 17 to the horizontal deflection plates 22 and the wire 25 leads from the vertical synchronizing coil 19 to the vertical deflection plates 23. The front portion of the tube 21 may be provided with the usual screen 26 to which is connected the high voltage supply customarily used in the electrostatic scanning for the cathode ray tube. A filter for removing the 120 cycle per second vibration is shown at 27. This frequency to be filtered out is due to a ripple content in the direct current supply voltage for the magnet power supply 10. Another frequency to be filtered out is that due to the rotation of the scanning disc through the stray field of the yoke with the frequency of one cycle per revolution of the disc, equivalent to 38 cycles per second, and this is removed by the filter 28. A voltage amplifier 29 is located between these filters and the grid 20 of the cathode ray tube 21. An oscillator or frequency generator 31 is for the production of 760 cycles per second supplied to the horizontal deflection plates. Amplifiers 30 and 32 are located one on each side of the oscillator 31 for this sweep frequency to the horizontal deflection plates. A sweep frequency of 38 cycles per second is generated by the oscillator 34 and the amplifiers 33 and 35 provide the necessary voltage increase before the current is fed to the vertical deflection plates within the tube 21.

Figure 2:
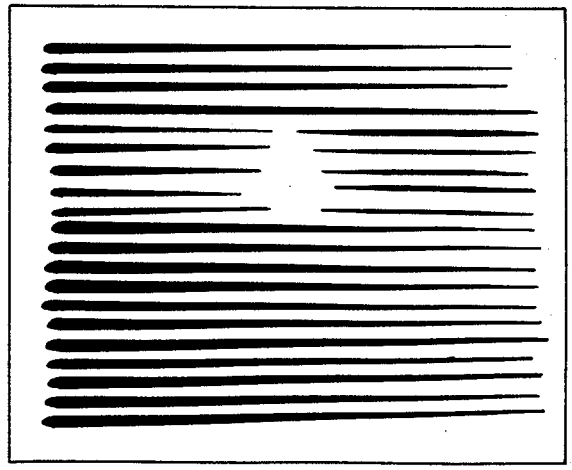
Fig. 2 is a photographic negative of an image showing the outline of an ⅛" hole in a steel bar.

In Fig. 2 is shown an image of a number 30 drill hole, the same being about ⅛" in diameter and placed in a steel bar. It will be noted that the picture shows a lack of definition a substantial part which is due to the limited number of lines in the raster. The apparatus tends to magnify the width of the discontinuity due to the fact that leakage field around the flaw is larger than the flaw itself. Of course, since the leakage field does not conform precisely to the shape of the defect the image is not an exact reproduction of the flaw but is larger than such flaw. The present invention is believed to be suitable for either surface weaknesses or flaws or such weaknesses in the metal as reside close to the surface where their magnetic flux distortion will be visible in the method disclosed.

Motion of the scanning disc through the localized fields produces eddy currents in the disc which are greater in magnitude than those developed when the structure of the specimen is uniform. If the disc had contained no scanning holes a more nearly uniform magnetic field would always have been present at the pickup coil. This field would have been the difference between the leakage flux around the flaw and the opposing flux due to the eddy currents on the disc. Thus the disc with no holes would act as a shield between the specimen and the pickup coil. However, with holes in the disc, the passing of a hole between the specimen and the coil momentarily removes the shield and the magnetic field at the coil is increased.

In this manner if a surface discontinuity is present a pulse of voltage is produced in the pickup coil when a hole passes the discontinuity. The filtered signal is amplified and rectified before being applied to the control grid of the cathode ray tube. Rectifier action is necessary to eliminate the positive portions of the signal which, if present, would result in the formation of a double image. In order that the signal voltage of the pickup coil will appear as a function of time in two dimensions, it is necessary to synchronize the initiation of the horizontal and vertical sweep voltages of the cathode ray tube with respect to the position and velocity of the scanning holes. A blanking generator triggered by the horizontal sweep oscillator applies a negative voltage to the grid of the cathode ray tube during the horizontal retrace time, removing the horizontal retraced lines from the tube's screen.

The present invention is believed to be preferable for many uses to the radiographic or X-ray type picture which requires more elaborate apparatus with a hazard to the operator. A better outline of the defect in Fig. 2 could have been obtained by the use of the higher horizontal sweep frequency.

We claim:

1. Apparatus for televisually producing a general outline of a surface flaw in a specimen of magnetic material, said apparatus including means for passing a field of substantially constant flux density through said specimen, a pickup device into which at least a portion of said field is directed, a rotative disc of non-magnetic material passing through said field of flux between said specimen and pickup device, means for driving said disc and mechanically scanning the flux density around said flaw, the modulations in flux density around said flaw being converted into electrical modulations by said pickup device, means for transmitting said electrical modulations to a receiver, means for changing the received electrical modulations in changes of light, means for producing a raster including means for producing vertical and horizontal sweep frequencies of light synchronized as to both speed and angular displacement with said disc, means for blanking the retrace portions of the horizontal sweep frequencies of light, and a screen on which an image formed by said rays is visible.

2. In an apparatus for imaging a flaw in a stationary specimen of magnetic material, the combination of means for subjecting said specimen to a substantially constant magnetic field, a pickup device into which said field is directed, means arranged to admit to said pickup device only such parts of said field as are representative of the magnetization at successive points in said specimen, means for producing voltage pulses representative of said flux pulses, and means operable in response to said voltage pulses to produce an image representative of said flux.

References Cited in the file of this patent

UNITED STATES PATENTS

| | | |
|---|---|---|
| 2,295,382 | Brace | Sept. 8, 1942 |
| 2,435,680 | Goldsmith | Feb. 10, 1948 |
| 2,617,854 | Van Valkenburg | Nov. 11, 1952 |